United States Patent
Kollinger, III et al.

(10) Patent No.: US 10,453,013 B1
(45) Date of Patent: Oct. 22, 2019

(54) METHOD FOR PROCESSING VEHICLE REPAIR

(75) Inventors: Albert J. Kollinger, III, Baden, PA (US); Albert J. Kollinger, Jr., Wexford, PA (US)

(73) Assignee: Inherent Leverage, Inc., Wexford, PA (US)

( * ) Notice: Subject to any disclaimer, the term of this patent is extended or adjusted under 35 U.S.C. 154(b) by 962 days.

(21) Appl. No.: 13/598,919

(22) Filed: Aug. 30, 2012

Related U.S. Application Data

(60) Provisional application No. 61/529,640, filed on Aug. 31, 2011.

(51) Int. Cl.
*G06Q 10/06* (2012.01)

(52) U.S. Cl.
CPC . *G06Q 10/06316* (2013.01); *G06Q 10/06315* (2013.01)

(58) Field of Classification Search
CPC ......... G06Q 10/0631; G06Q 10/06311; G06Q 10/06312; G06Q 10/06315; G06Q 10/0633
USPC .............. 705/7.12, 7.23, 7.26, 7.27
See application file for complete search history.

(56) References Cited

U.S. PATENT DOCUMENTS

| | | | | |
|---|---|---|---|---|
| 5,377,098 A * | 12/1994 | Sakai | ................ | B60S 5/00 705/29 |
| 7,020,620 B1 * | 3/2006 | Bargnes | ................ | G06Q 10/06 705/7.24 |
| 7,359,864 B2 * | 4/2008 | Carlson et al. | ............. | 705/7.25 |
| 7,389,276 B1 * | 6/2008 | Barnard | ................ | G06Q 30/02 702/182 |
| 7,487,018 B2 * | 2/2009 | Afshar | ................ | G06Q 10/06 701/29.6 |
| 2002/0065702 A1 * | 5/2002 | Caulfield | ............... | G06Q 10/04 705/7.15 |
| 2002/0069216 A1 * | 6/2002 | Bates | ................ | G06Q 30/06 715/234 |
| 2002/0073012 A1 * | 6/2002 | Lowell | ............... | G06Q 30/0601 705/37 |
| 2002/0111844 A1 * | 8/2002 | Vanstory | ................ | G06Q 10/06 705/7.13 |

(Continued)

OTHER PUBLICATIONS

"Maintenance of Supplies and Equipment: Guide for Motor Pool Operations;" Headquarters, Department of the Army; Department of the Army Pamphlet 750-35; Aug. 1, 1994; pp. 4-6.*

(Continued)

*Primary Examiner* — Tyler W Knox
(74) *Attorney, Agent, or Firm* — The Webb Law Firm

(57) ABSTRACT

A method for processing work for a third party co-pay system is provided. The invented method will improve workflow through a third party co-pay system by more efficiently utilizing the capacity of the assessor so that the assessor can release more work to downstream departments. A method for processing vehicle repair is similarly provided. The invention further includes a method for tracking a vehicle through the vehicle repair process whereby the location of the vehicle is displayed on monitors located throughout the vehicle repair shop to alert shop personnel of where a vehicle is located and when certain repair activities must be performed on that vehicle. Finally, methods of managing workflow both within an individual department of a vehicle repair shop and throughout the whole vehicle repair shop are provided.

4 Claims, 2 Drawing Sheets

(56) References Cited

U.S. PATENT DOCUMENTS

| | | | | |
|---|---|---|---|---|
| 2002/0186144 A1* | 12/2002 | Meunier | ............... | G07B 15/00 340/4.6 |
| 2003/0050830 A1* | 3/2003 | Troyer | ................ | G06Q 10/06 705/7.38 |
| 2003/0158640 A1* | 8/2003 | Pillar | ................... | A62C 27/00 701/29.4 |
| 2004/0059618 A1* | 3/2004 | Ford | ..................... | G06Q 10/10 705/305 |
| 2004/0102983 A1* | 5/2004 | Carlson | ............... | G06Q 10/04 705/7.19 |
| 2004/0199412 A1* | 10/2004 | McCauley | .......... | G06Q 10/109 705/26.2 |
| 2006/0031041 A1* | 2/2006 | Afshar | ................. | G06Q 10/06 702/184 |
| 2008/0066072 A1* | 3/2008 | Yurekli | ................ | G06Q 10/06 718/104 |
| 2009/0018859 A1* | 1/2009 | Purifoy | ................ | G06Q 10/10 705/305 |
| 2009/0038741 A1* | 2/2009 | Mueller | ................. | G09F 3/10 156/152 |
| 2009/0197228 A1* | 8/2009 | Afshar | ................. | G06Q 10/06 434/219 |
| 2010/0138242 A1* | 6/2010 | Ferrick | ............... | G06Q 10/087 705/4 |

OTHER PUBLICATIONS

"Maintenance Operations and Procedures;" Headquarters, Department of the Army; FM 4-30.3; Jul. 2004; pp. 4-9, 8-6.*

"Scheduling Labor Effectively," Bob Keith, Body Shop Business, Jan. 1, 2002, available at <http://www.bodyshopbusiness.com/scheduling-labor-effectively/#>, accessed Nov. 2, 2015.*

"Maintenance of Supplies and Equipment: Guide for Motor Pool Operations;" Headquarters, Department of the Army; Department of the Army Pamphlet 750-35; Aug. 1, 1994.*

"Maintenance Operations and Procedures;" Headquarters, Department of the Army; FM 4-30.3; Jul. 2004.*

* cited by examiner

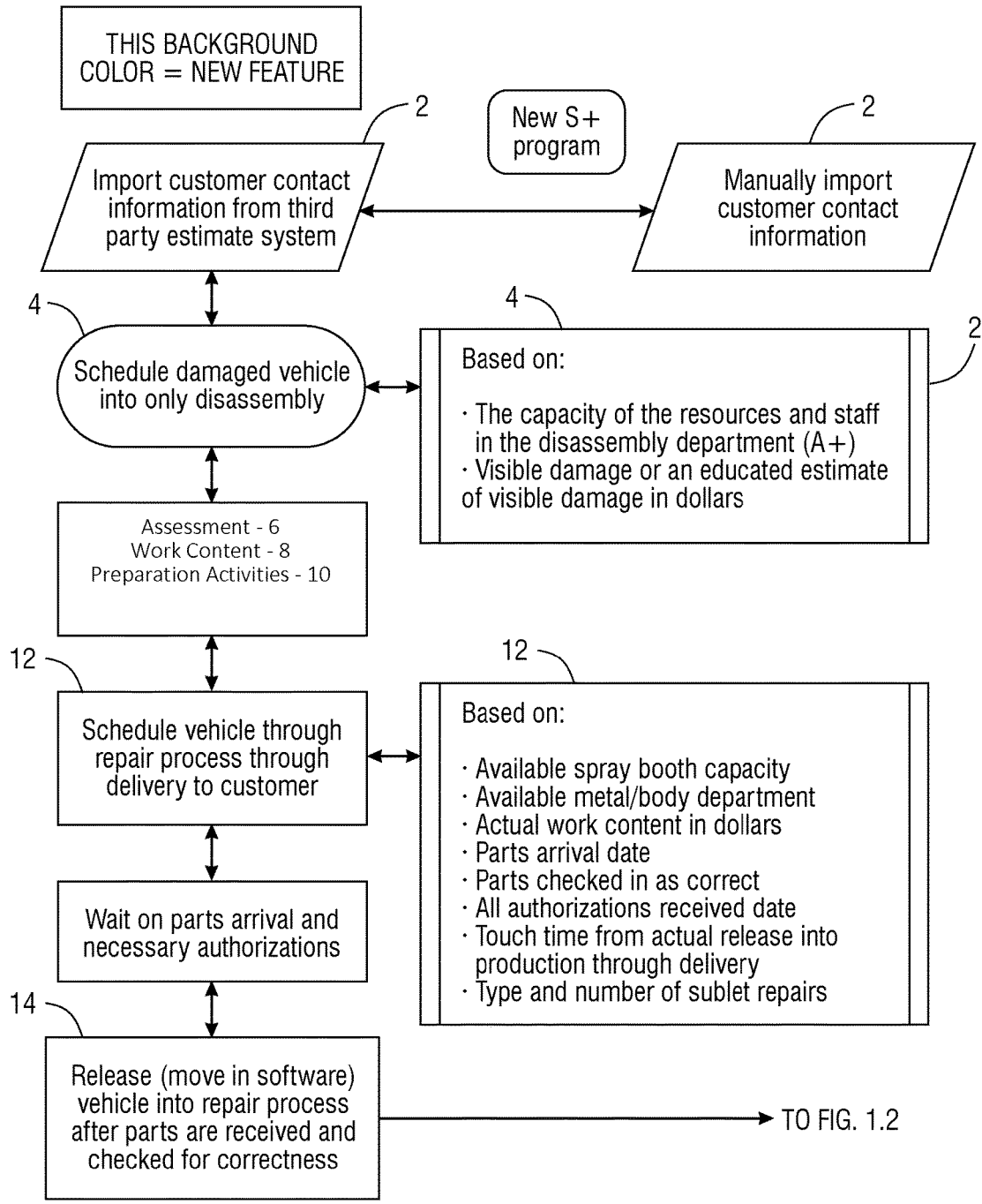
*Fig.1.1*

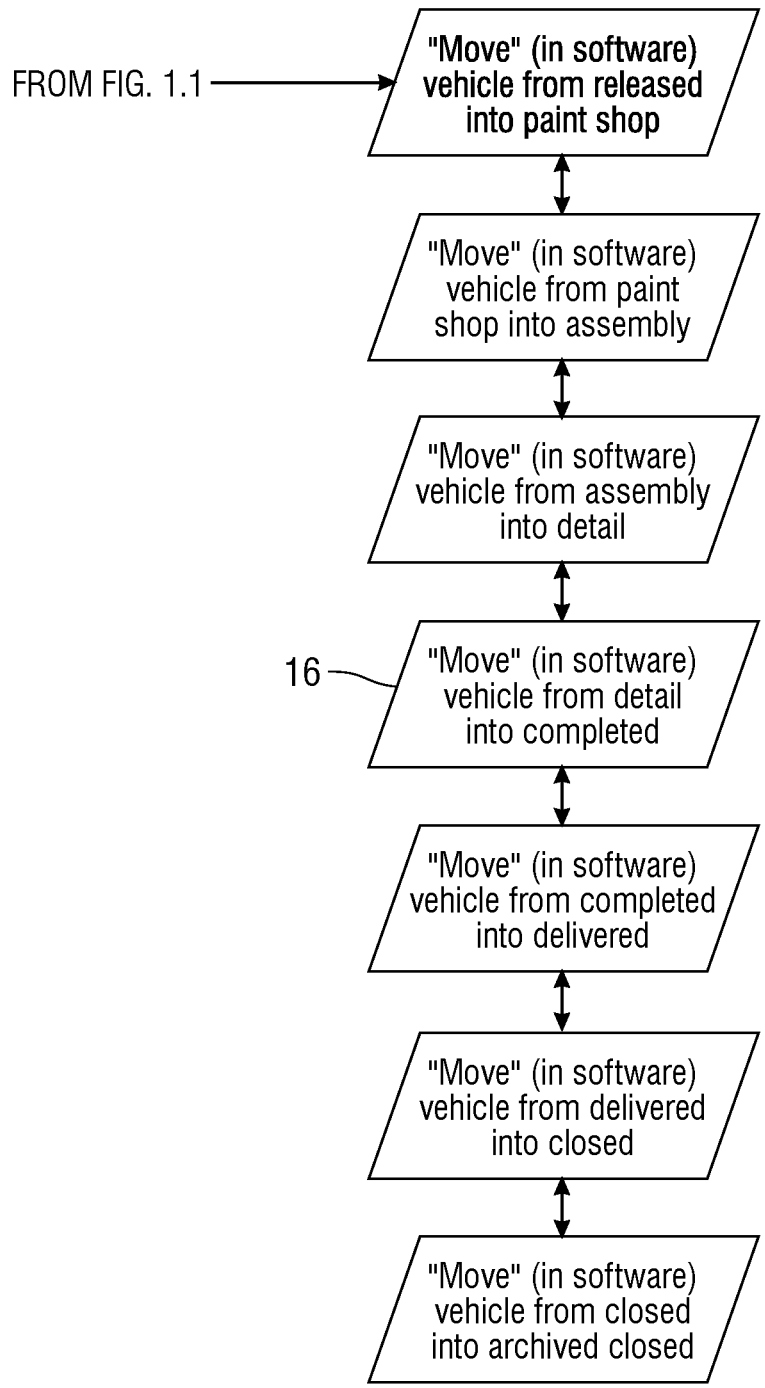
Fig.1.2

METHOD FOR PROCESSING VEHICLE REPAIR

CROSS-REFERENCE TO RELATED APPLICATIONS

This Application claims the benefit of U.S. Provisional Application No. 61/529,640, filed Aug. 31, 2011, the entirety of which is incorporated herein by reference.

STATEMENT REGARDING FEDERALLY SPONSORED RESEARCH OR DEVELOPMENT

Not Applicable

INCORPORATION-BY-REFERENCE OF MATERIALS SUBMITTED ON A COMPACT DISK

Not Applicable

BACKGROUND

Field of the Invention

The invention relates to the field of methods for processing work to be completed in a third party co-pay system. One embodiment of the invention relates to a method for processing vehicle repair.

Description of the Related Art

Scheduling the Processing of a Vehicle

According to the most common method for processing a vehicle through a vehicle repair shop, an available technician begins working to repair the vehicle, but usually stops at some point during the process because of unforeseen interruptions. Often the repair process is interrupted as the technician waits while replacement parts are ordered and received and while he seeks supplemental approval to repair damage discovered after the repair process had already begun. As the technician waits for the new parts and approvals, he often begins working on another repair job. Under this method, numerous repairs occur in parallel; however, repairs are often interrupted for unforeseen periods of time. Vehicle collision repair is especially susceptible to these unforeseen delays because collision-damaged vehicles usually have hidden damages which require additional work, parts, or supplemental approvals from insurance companies.

The disadvantage of this traditional approach to moving vehicles through the repair process is that, since unforeseen delays interrupt the repair process, it is impossible to schedule work in the shop's repair departments far enough in advance to ensure that each department has sufficient work each day. For example, the paint department of a vehicle repair shop may be able to work on seven cars in one day. A vehicle repair shop could begin repairs on seven cars on Monday expecting that all seven would be ready for painting on Thursday. However, if three vehicles are delayed waiting for parts, only four cars will be painted on Thursday and the paint shop will not be able to fully utilize its time that day. As a result, the shop utilizes time in its repair departments less efficiently than it would without the unforeseen delays. A second disadvantage of this traditional approach is that the total repair time from vehicle drop off to delivery to the customer is longer than necessary. Furthermore, customers do not receive accurate estimates of when their repair will be completed.

In order to improve the flow of vehicles through the vehicle repair shop, a blueprinting process was suggested. Under this system, an initial schedule for the entire vehicle repair was created when the vehicle first came to the shop. This initial schedule was based on the capacity of the assessment department, capacity of production departments, a visual inspection of the vehicle, and whether all damage was known. Based on this initial schedule, capacity in the production departments including the paint department and metal work department was reserved. A method for scheduling an appointment for vehicle repair which sought to balance intake and outflow of repair jobs by taking into account the available capacities of the repair shop's departments was taught in U.S. Pat. No. 7,359,864. The '864 patent teaches that by balancing intake and outflow based on available capacity in the individual departments of a vehicle repair shop, the work flow through the entire shop would be improved.

According to the blueprinting process, after the initial schedule was created, the vehicle was assessed by thoroughly disassembling the vehicle to reveal any hidden damage. Based on the assessment, parts were ordered for all necessary repairs and all authorization sought. The process of obtaining parts and verifying that the received parts were correct for the anticipated repair is known as "kitting" or "staging." Once the "kit" was completed, the production schedule was revised. The vehicle was released for production according to the revised schedule. Under the blueprinting system, the vehicle should flow through production without additional delays.

However, this blueprinting process was flawed in two ways. First, once all available time in the production (metal and paint) departments was reserved based on the initial schedule, the assessment department stopped taking in new vehicles even though the assessment department could have done more work that day. Thus, under the blueprinting process, available capacity in assessment was often wasted. Second, the initial schedule usually needed to be revised anyways, because additional damage was discovered during assessment. Therefore, the production departments appeared to have work available on particular days, but once the schedule was revised to account for newly discovered damage, no work was actually made available. As a result, time in the production departments was not utilized efficiently and total repair time was longer than necessary.

A related result of ceasing assessment when downstream activities were fully scheduled was that it was difficult to predict when the shop would be able to perform additional assessments. In light of this uncertainty, vehicle repair shops only allowed a customer to schedule a vehicle drop off time. The customer could not directly schedule when work on the vehicle would begin. The vehicle was not scheduled for assessment or production until it arrived on site. Accordingly, the vehicle could sit at the shop without being worked on for a period of time when its owner might, otherwise, have been able to use it. This inability to schedule when assessment work could begin has prevented vehicle repair shops from taking advantage of Internet-based online scheduling technologies. At best, shops which rely on a blueprinting scheduling process could create a website allowing a customer to select a time to drop off a vehicle. The customer could not schedule any actual work content using the web site.

Managing Workflow Activities

Another challenge of processing a vehicle repair is managing the order in which repairs are completed in the various production departments. Traditionally, individual departments such as paint or metal managed their workload themselves, deciding how long the repair activity would take and promising a date when the vehicle would be delivered to the next repair department. The individual departments prioritized their daily schedules based on which "promise date" was most imminent. Vehicles that were overtime or close to being overtime were worked on first.

This approach to managing vehicle repair was inefficient for two reasons. First, each department would add its own time buffer to account for delays that were likely to occur while the vehicle was in that department. Typically, the added buffer was about ⅔ of the predicted repair time. Thus, a three hour repair could be scheduled for five hours. This practice meant that a significant portion of scheduled time each day was really dedicated to time buffers. The individual departments failed to appreciate just how quickly a repair could be completed and moved on to the next department under optimal conditions, if necessary. Additionally, the large buffer time encouraged multitasking meaning that multiple vehicle repairs would be worked on in parallel rather than working on a single repair and moving it to the next department as a fast as possible.

A second disadvantage of department-based approach was work was prioritized within a department based on which vehicle was most overtime with regards to its promised delivery date to the next department. The repair shop would work on the vehicle with the most imminent promised date first. However, this practice did not take into account whether a vehicle was in danger of failing to meet its ultimate goal of on-time delivery to the customer. Accordingly, a department would work on a vehicle which had been in the department for a while but which was not in danger of missing a final delivery deadline instead of working on a vehicle which recently arrived in the department but needed to be moved through quickly to ensure that the total repair could be completed on time.

A second factor in managing a repair through the repair shop is modifying capacity of assessment and production to account for changes in customer demand. Currently, decisions about which departments need additional staff to complete assigned tasks are based on which departments have a backlog of work at a given time. A disadvantage of this approach is that it fails to take into account whether recognized constraint points such as the paint department will need additional work to operate at high capacity in the future. Accordingly, unless whether this additional work would flow through common constraint points was taken into account, efforts to reduce the backlog in one department might only succeed in moving the backlog to a downstream department.

For the foregoing reasons, there is a need for a more efficient method of processing vehicle repair through a vehicle repair shop. Specifically, there is a need for a method which utilizes the time of the assessment department in an efficient manner so that the assessment department can release as much work for production as possible on any given day. Similarly, there is a need for a method which accurately schedules work for the production departments so that those departments are able to operate closer to full capacity on a more regular basis. Finally, there is a need for a method of processing a vehicle which allows customers to directly schedule when the work on their vehicle will actually begin instead of being limited solely to scheduling a drop-off time.

There is also a need for a more effective method of managing vehicle repair so that repair work is prioritized and capacity of repair departments is modified in a manner that effectively increases total output. Specifically, there is a need for an effective buffer management system which prioritizes work on a shop-wide basis rather than only focusing on individual departments and communicates the prioritization decisions to vehicle repair shop employees. Similarly, there is a need for an effective feed back loop system which takes into account common constraint points such as the paint department to determine which stages of assessment and production require an increase or decrease in capacity based on current customer demand.

BRIEF SUMMARY

A method for processing vehicle repair is described. According to the invented method, the vehicle repair is processed by providing and gathering initial diagnostic information. The initial diagnostic information could be obtained when a customer enters the information on an Internet Website before the vehicle is brought to the repair shop. Based on the initial diagnostic information and the capacity of the assessor, the vehicle is scheduled for assessment. The assessment schedule is not based on the capacity of metal or the capacity of paint. At this initial stage, the vehicle is not scheduled through the rest of production. During the assessment, the actual work content of the repair is determined. Similarly, during the assessment, the assessor determines what production preparation activities must be undertaken before production of the repair can begin. The assessor could also schedule and oversee the completion of sublet activities such as removing and replacing glass, air bag diagnostics, and mechanical repairs. The production schedule is then determined and scheduled based on the actual work content, estimate of when production preparation activities will be completed, and the capacity of the production departments. In one embodiment of the invention, the capacity of production and the capacity of the assessor could be varied based on a feedback loop wherein the feedback loop determines when and where to increase or decrease capacity. Once the production schedule has been determined, the vehicle is released to production and subsequently processed pursuant to the production schedule.

The invention further includes a method for tracking a vehicle through the vehicle repair process. According to the invented method, a vehicle is provided. A RFID tag is affixed to the vehicle. RFID reading apparatuses are placed throughout the interior and exterior of the vehicle repair shop. Numerous display monitors are also provided for displaying the physical location of the vehicle in real time based on information recorded by the RFID reading apparatuses. The monitors could be placed throughout the repair shop such as, for example, in each of the repair departments. The vehicle is then tracked throughout the vehicle repair shop and the progress is displayed on the display monitors. In one embodiment of the invention, the status of the vehicle is automatically updated based on information about the location of the vehicle provided by the tracking system. Finally, in one embodiment of the invention, a specific vehicle parking space is provided where the vehicle can be parked when the repair of the vehicle is completed.

The invention further includes a method for managing work in a department of a vehicle repair shop. The invented method includes receiving a plurality of vehicles to be repaired from an upstream department wherein each vehicle has a pre-determined total production schedule, which was set before the vehicle was released to production, and a time buffer. An order to perform a repair activity for each vehicle is determined wherein the vehicle with the shortest time buffer is repaired first. Once the order is set, the repair activities are performed in accordance with the order. The time buffer for the vehicle is then updated based on whether the repair activity was completed on time according to the pre-determined schedule. Once the repair is completed and the time buffer modified, the vehicle is released to a downstream department for further repair work.

The invention further includes a method of managing the workflow in a vehicle repair shop. The invented method includes providing a system for scheduling and monitoring workflow that determines available capacity and tracks the workflow. The tracking and capacity information is then projected on a display for a decision maker. The displayed tracking and capacity information is then used to manage the workflow by making workflow decisions based on the displayed information.

Finally, a method of processing work to be completed by a third party co-pay system, as provided by this invention, includes providing and gathering initial diagnostic information about the work to be completed. The work to be completed for assessment by an assessor is scheduled based on the initial diagnostic information and a capacity of the assessor. The capacity of production is not considered. The production preparation activities are then determined. The work to be completed is scheduled into production based on the actual work content, the production preparation activities, and a capacity of production. The work is then completed thereby completing the processing of the work.

Therefore, the general object of this method is to provide a more efficient method for processing work to be completed in a third party pay system. In one embodiment of the invented method, the method is adopted for use processing vehicle repair in a collision repair shop.

More specifically, the object of the invented method is to ensure that the assessor works at full capacity so that the assessor is better able to release work for production. As a result of the invented method, the production departments will be able to process more vehicles in less time.

An additional object of this invention is to provide a method for tracking a vehicle through the repair shop and to communicate the location of each vehicle to repair shop staff. It is an object of the invention that the displayed information will be used by a decision maker to manage workflow.

A final object of the invention is to manage workflow more efficiently in the vehicle repair environment. What vehicle to repair when will be prioritized based on a buffer management system wherein vehicle repairs with the shortest remaining total buffer will be repaired first.

BRIEF DESCRIPTION OF THE DRAWINGS

FIG. 1.1 and FIG. 1.2 (together, FIG. 1) show a flow chart which depicts a method for processing vehicle repair according to one embodiment of the invention. The flow chart depicts the steps for processing a vehicle, beginning with inputting customer contact information and continuing through delivering the repaired vehicle to the customer, closing the customer's file, and archiving the file.

DETAILED DESCRIPTION

Examples and Explanatory Definitions

"processing"—Processing refers to the activities performed to effectuate the vehicle repair, from the time that the repairer becomes aware that the vehicle has been damaged and is in need of repair until the finished product is released to the customer. In a vehicle collision repair service shop, processing can include: administrative activities prior to assessment such as gathering customer personal information, scheduling the assessment, assisting in filing customer's claim to the insurance company or other payer, and arranging vehicle rentals. Processing further includes: assessment, pre-production activities, releasing the vehicle into production, performing metal work, preparing the vehicle for painting, painting the vehicle, reassembling the vehicle, completing sublet repairs, and clean-up jobs. Finally, processing includes post-production activities such as collecting money, processing paperwork, and showing and reviewing the finished product with the customer.

"vehicle"—A vehicle is a device for transporting people or goods. A vehicle could include an automobile, truck, sport utility vehicle (SUV), motorcycle, tractor, airplane, motor home, travel trailer, or train. The term vehicle does not necessarily refer to the entire vehicle, but may refer to a partial vehicle, a group of vehicle parts, or even a single part such as an engine or transmission. The invented method can be used to process and track partial vehicles or vehicle parts as well as an entire vehicle.

"repair"—Repair means to restore to a sound condition following damage. A vehicle collision repair shop will repair damage to a vehicle resulting from a collision as well as other damage such as body damage including dents, dings, chips, or metal corrosion. A vehicle repair shop may also perform other maintenance tasks as the customer requires.

"initial diagnostic information"—Initial diagnostic information is information relating to the scope of the damage or injury to the vehicle. Initial diagnostic information can also include identification information such as a client's name and contact information, vehicle make/model, VIN (serial number), vehicle color, and payer's name, insurance company name, and insurance company contact information. At this initial stage, a vehicle repair shop may also consider whether the repair will require work from other sublet entities including: air bag diagnostics, check engine lights, wheel alignments, glass removal and installation, glass replacement, painted stripes, aftermarket accessories, paintless dent repair, or various mechanical repairs and replacements.

"providing and gathering"—Diagnostic information may be provided by or gathered from many sources including the customer, the owner of the vehicle, or third parties with sufficient knowledge such as an insurance company, claim adjuster, police, tow truck driver, and dealer or used car lot operators (when repairing new vehicle damages and used vehicles for resale). In addition to information provided by others, vehicle repair shop employees may gather information including details about the accident such as what happened, who was involved, was anyone hurt, what insurance, if any, will be paying for repairs, or whether the vehicle owner paid out of pocket expenses.

"assessment"—During assessment, the assessor performs a detailed inspection of the vehicle to better appreciate the scope of the damage. At this time, the assessor may also consider the extent and cost of cosmetic repairs and normal maintenance repairs. Assessment may include complete disassembly of the damaged area of the vehicle to discover hidden damage and to ensure that the true extent of what repairs are needed is known. The assessor may be responsible for the disassembly or may be assisted in the disassembly process by another technician. The assessor may also input repair or replacement items and sublet repairs into a third party estimating system, locate parts from vendors, and seek advice or professional decisions from auto body metal and paint technicians. The assessor may negotiate repair and replacement costs with an insurance appraiser or the party paying for the repairs. The assessor may review and explain the repairs to the vehicle owner or insurance company. Finally, the assessor may take photos of the vehicle and load them into a computer program. In the collision repair industry, assessment is often referred to as blueprinting.

"capacity of the assessor"—Capacity refers to the total amount of actual work content that an individual or department can perform over the course of a given period. An assessor appears to operate at full capacity when he is assigned work for the entire day and when it is estimated that there is no available time in which to complete additional work. In an embodiment of the invention, the assessor has the option to schedule additional assessments even once his time is fully assigned. Factors which impact assessor capacity include: the number of assessors working on a particular day; the assessor's skill level and knowledge; and, the skill level, knowledge, and number of assistants working with the assessor to help with assessment tasks. Additional factors which impact assessor capacity include: whether the assessor disassembles the vehicle himself or whether he is assisted by others, whether the assessor must negotiate the repair and replacement costs with an insurance appraiser or paying party, whether the assessor must review and explain the repairs to the vehicle owner or insurance company, and whether the assessor takes photos of the vehicle and loads them into a computer program.

"capacity of paint"—Capacity refers to the amount of work a department can perform over a given period. One possible means of considering the capacity of paint is to take into account the number of minutes the spray booth or spray booths are available to operate during a workday.

"capacity of metal"—Capacity refers to the amount of work a department can perform over a given period. The metal department is responsible for repairing the vehicle body. Metal repair may include replacing and repairing damaged body parts, repairing dents, repairing unibody, repairing and replacing frame, replacing or removing and reinstalling mechanical parts, or repairing rust damage. One method of measuring capacity of the metal repair departments is to consider the total sales dollars that can be repaired in a work day.

"actual work content"—Actual work content refers to the production activities which must be accomplished to complete the repair. Actual work content may include replacing old or damaged parts, metal work to repair damage to the vehicle body, painting the vehicle, reassembling the vehicle, and cleaning the vehicle after all other work is completed. Actual work content may also include sublet work such as air bag diagnostics, check engine lights, wheel alignments, glass removal and installation, glass replacement, painted stripes, paint-less dent repair, or various mechanical repairs and replacements.

"production preparation activities"—Production preparation activities refers to activities that should be accomplished before production (actual work content) activities can begin. Production preparation activities include determining whether parts and other raw materials needed for the repair are available. If parts are not available, they must be ordered, and the estimated time to obtain the ordered materials should be determined. It is also necessary to obtain authorizations to complete the repair including supplemental approvals from insurance companies and/or the vehicle owner. In the vehicle repair industry production preparation activities may be referred to as "staging" or "kitting."

"capacity of production"—Capacity of production refers to amount of work which can be completed over a given period by the production departments, namely the metal department and the paint department. Factors which impact the capacity of the production departments include: the skill level and knowledge of the technician, the complexity of the repair, the availability of equipment, and the number of work stalls or space available to store additional vehicles in the metal department.

"sublet entities"—Sublet activities are repairs by other entities. Sublet repairs may include removal, reinstallation, or replacement of glass, pre-release or post-release wheel alignment, air bag diagnostics and repair, and mechanical work.

"customer"—the customer could be the private owner of a vehicle but could include other entities as well. Customer could include a used car dealer who is seeking to have the vehicle repaired. The customer could also be an insurance company.

"Internet Website"—A collection of related webpages containing content including images, text, or videos that is accessible using a computer over a network such as the Internet. According to one embodiment of the invention, the Website includes a location where a customer can enter initial diagnostic information concerning the condition of a damaged vehicle. In another embodiment of the invention, the customer could enter the initial diagnostic information over the phone or in person and then directly schedule a time for assessment based on that initial diagnostic information.

"Feed back loop"—A feed back loop takes information from the output of an event to modify the occurrence of the same event in the present or future. According to the instant invention, when the paint or assessment departments have available capacity, they can place pressure on upstream departments to release more work so that the available capacity can be filled. The paint spray booth calls for more capacity when inventory in the paint preparation department falls below a minimum level. Similarly, assessment will call for more capacity if the paint spray booth is in danger of falling below its minimum inventory level and if assessment, while operating at current levels, would be unable to provide vehicles to fill that capacity.

"Radio-frequency Identification (RFID) tag"—An electronic tag which communicates with a reading apparatus using radio waves. The RFID tag can be affixed to an object. Since the reader records when a tagged object passes by, a system of readers can be set up to track the location of the object.

"RFID reading apparatus"—An apparatus capable of reading radio waves from RFID tags and used to track the location of the tags. RFID reading apparatus can be located in various areas inside and outside the shop, including but not limited to, the assessment department, the metal department, and the paint department.

"display monitors"—A device capable of displaying which vehicles are located in which areas of the shop. The monitor may also display the current day's schedule and the schedule for a number of days in the future. The monitor could also display screens depicting certain reports, part ordering information, or labor flagging. A display monitor could be a television, a computer monitor, or an LCD monitor.

"real time"—Real time means that the display is updated continuously or refreshed at a reasonable rate so that the monitor gives an accurate representation of the location of each vehicle in the vehicle repair shop at any given time and an accurate representation of certain department's capacities including, for example, the assessor's progress and the paint department's progress on their daily schedule.

"automatically"—in one embodiment of the invention, the tracking system is integrated with the workflow management system so that when the RFID tracking system recognizes that a vehicle has moved from one department to another, the work management system updates its displays and order of work accordingly. A technician or other employee does not have to update the system manually.

"the status"—information including the location of the vehicle, the production schedule for the vehicle, and the amount of time buffer remaining for the vehicle repair.

"parking space"—location outside of the shop where the vehicle can be moved after the repair is completed and where the vehicle can remain until the owner returns to accept the vehicle.

"upstream department"—a department which has completed its repair activities before the vehicle arrived at the current department in the repair process. For example, the assessment department is upstream from the paint department.

"pre-determined production schedule"—the schedule for the repair of the vehicle including the time required for each element of the repair. The schedule is based on the optimal repair time without taking into account common delays. According to the instant invention, the production schedule is determined after the vehicle is assessed and includes all repair activities necessary to complete the repair of the vehicle.

"time buffer"—an amount of time added to the production schedule to account for delays which cause the repair to take longer than predicted. The time buffer is for the total repair and is updated when the vehicle moves from one department to another.

"order to perform a repair activity"—the order or schedule which technicians in a department follow when deciding which work to complete. In one embodiment of the invention, the order is displayed on a monitor located within the department. The order is updated as vehicles move through departments according to the method for tracking a vehicle.

"updating"—means to change a value based on new information. In one embodiment of the invention, the time buffer is reduced when the repair work was not completed within the time required by the production schedule.

"managing the workflow"—refers to making decisions about which vehicle repair activities must be completed and prioritizing when to perform certain repair activities to ensure that the maximum number of vehicles are worked on each day. The goal of managing workflow is to decrease the amount of time that a vehicle remains in the shop and to increase the number of vehicles returned to customers each day.

"tracks workflow"—tracking means to determine the location of a vehicle within the vehicle repair shop. One method of tracking a vehicle is using RFID transmitters as described according to the method for tracking a vehicle through the vehicle repair process.

"decision maker"—the entity that determines how best to manage workflow by prioritizing when repair work on various vehicles will be completed. The decision maker could be an employee of the vehicle repair shop or a computer program which gathers and analyzes what work to complete when.

"third party co-pay"—any type of insurance or indemnification arrangement where a third party pays all or a portion of any associated costs. Under these systems, the third party could be responsible for paying up to 100% of the total costs.

DESCRIPTION

FIG. 1 is a flow chart depicting the method of processing a vehicle repair according to one embodiment of the invention. As shown in the flow chart, the initial diagnostic information 2 is provided and gathered from a third party estimate system or by talking with a customer and manually entering information. Based on the initial diagnostic information 2, the vehicle is scheduled for assessment 4. During assessment 6, the vehicle is disassembled and the actual work content 8 and production preparation activities 10 are determined. Based on assessment 6, the vehicle is scheduled for production 12. The vehicle is repaired 14 according to the production schedule 12. Once the repair 14 is completed, the vehicle is delivered to the customer, thereby completing processing 16 of the vehicle.

FIG. 1 show a person of ordinary skill in the art how to make and use the preferred embodiment of the invention. All teachings in the drawings are hereby incorporated by reference into the specification.

Various changes could be made in the above method without departing from the scope of the invention as defined in the claims below. It is intended that all matters contained in the paragraphs above, as shown in the accompanying drawings, shall be interpreted as illustrative and not as a limitation.

We claim:

1. A method of processing vehicle repair comprising:
    (a) providing a damaged vehicle for repair;
    (b) providing and gathering initial diagnostic information for a vehicle;
    (c) scheduling the vehicle for assessment by an assessor based on the initial diagnostic information and a capacity of the assessor, and without considering capacity of paint and capacity of metal;
    (d) determining actual work content required for the vehicle;
    (e) determining production preparation activities;
    (f) scheduling the vehicle into production based on the actual work content, the production preparation activities, and a capacity of production; and
    (g) repairing the vehicle thereby completing the processing of the vehicle repair.

2. A method as recited in claim 1 further comprising completing repairs by sublet entities before scheduling the vehicle into production.

3. A method as recited in claim 1 wherein providing and gathering initial diagnostic information is accomplished when a customer enters the initial diagnostic information on an internet website before the vehicle is brought to the vehicle repair shop.

4. A method as recited in claim 1 further comprising varying the capacity of production and the capacity of the assessor based on a feed back loop whereby the feed back loop determines when and where to increase or decrease the capacity.

* * * * *